July 5, 1932.  R. A. MORTON  1,865,463
TRACTION TRUCK FOR VEHICLES
Filed March 23, 1927   7 Sheets-Sheet 1

July 5, 1932.  R. A. MORTON  1,865,463
TRACTION TRUCK FOR VEHICLES
Filed March 23, 1927   7 Sheets-Sheet 3

Witness
Milton Lenoir

Inventor:
Rolla A. Morton,
John L. Jackson
By
Attorney.

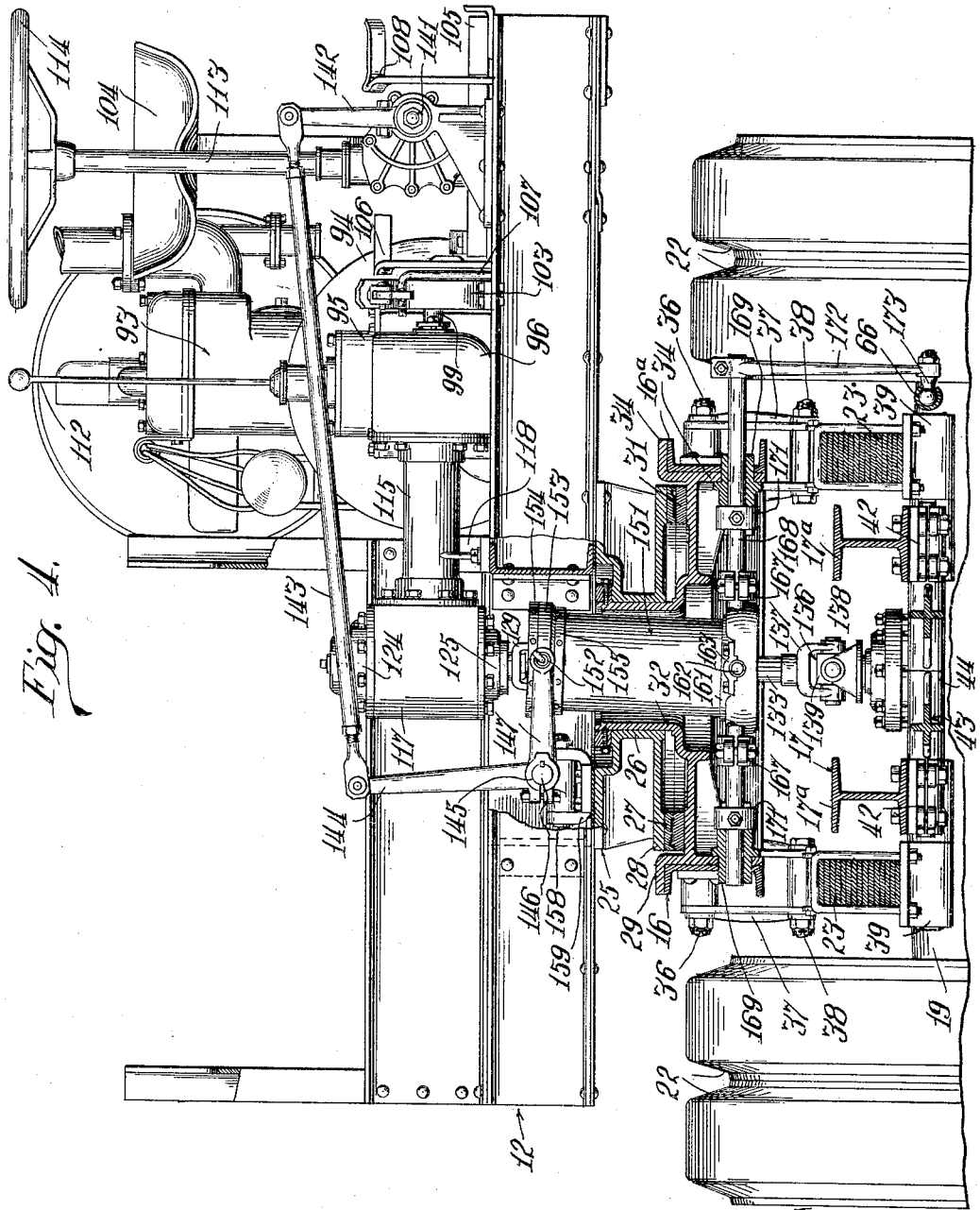

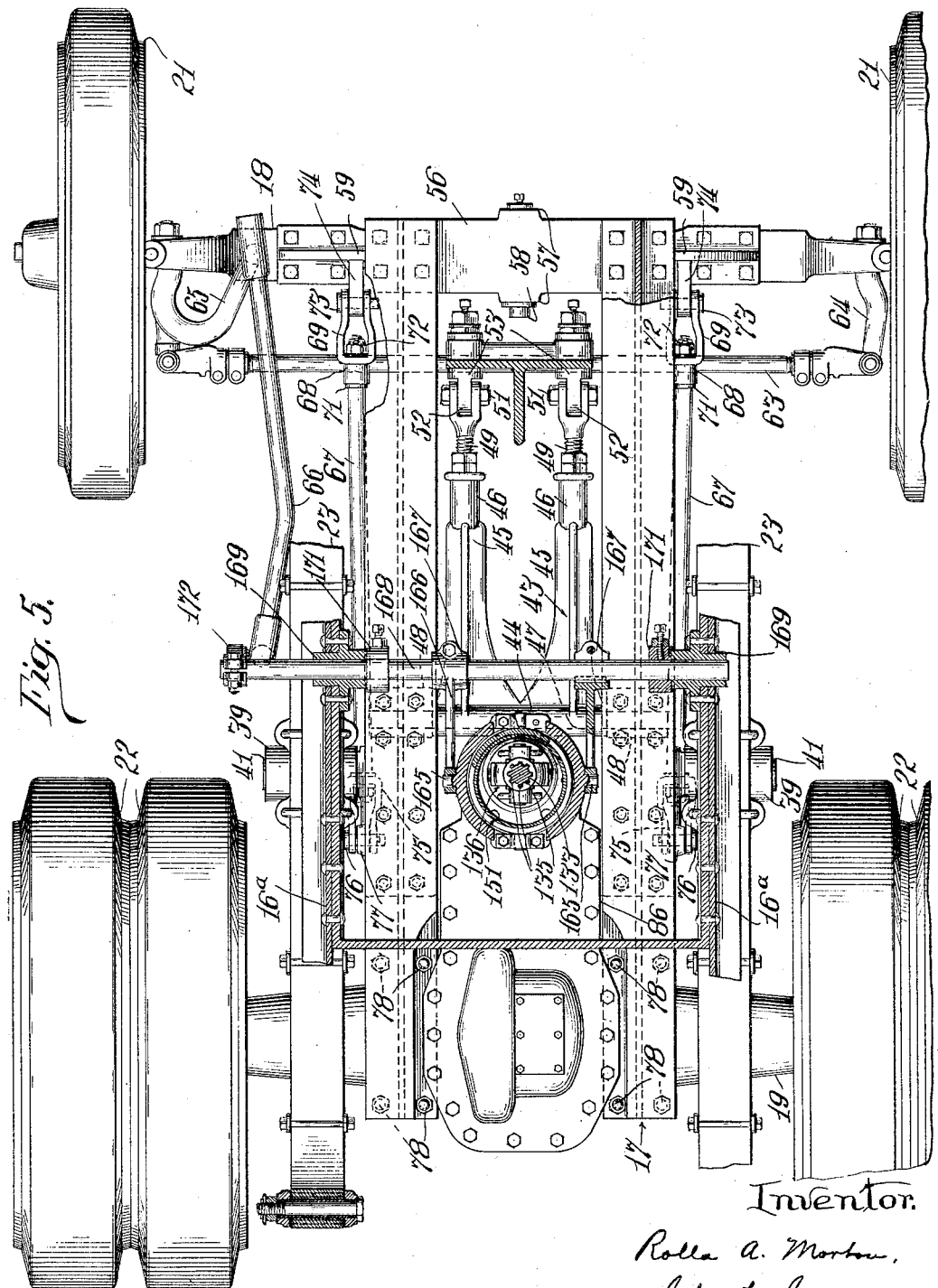

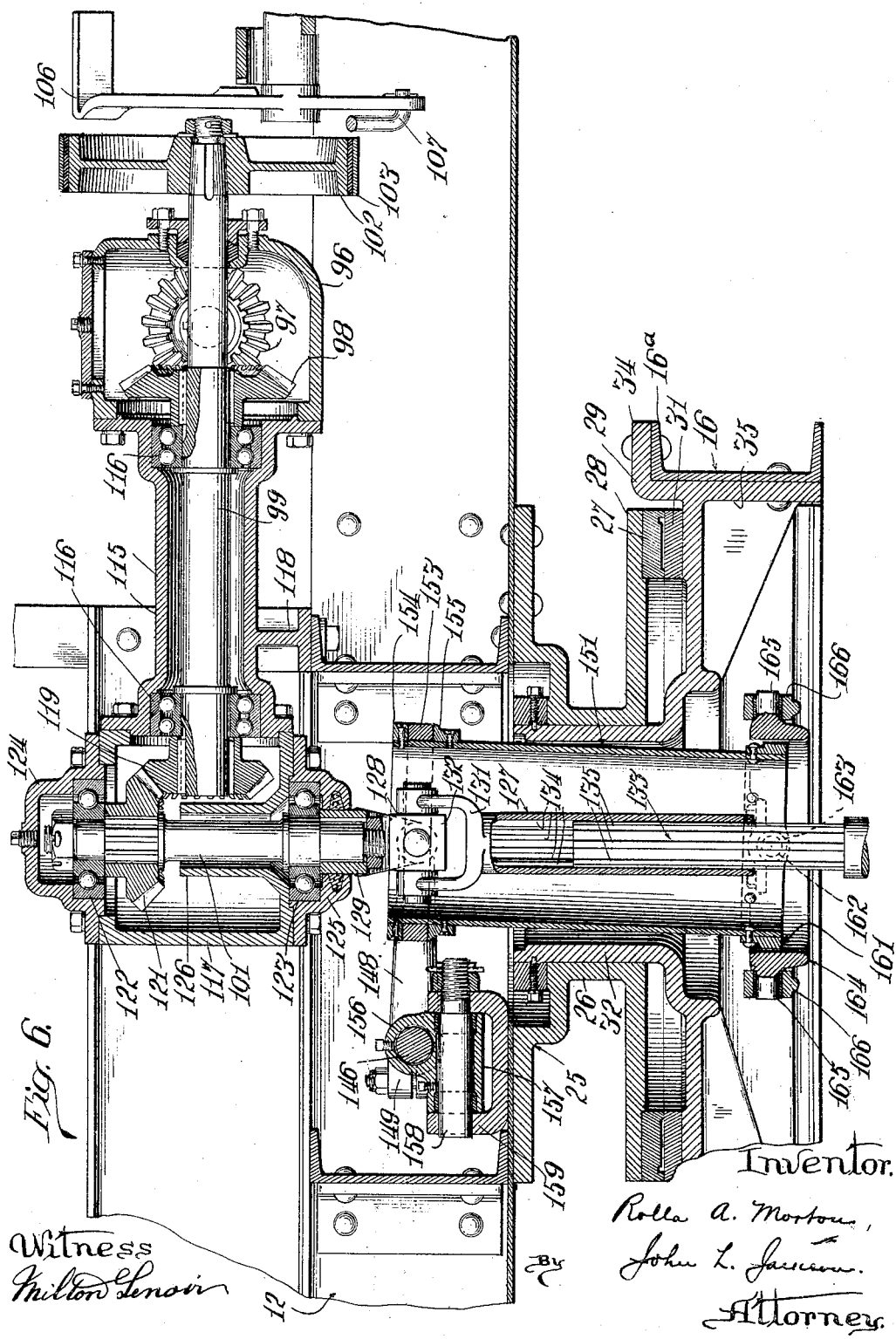

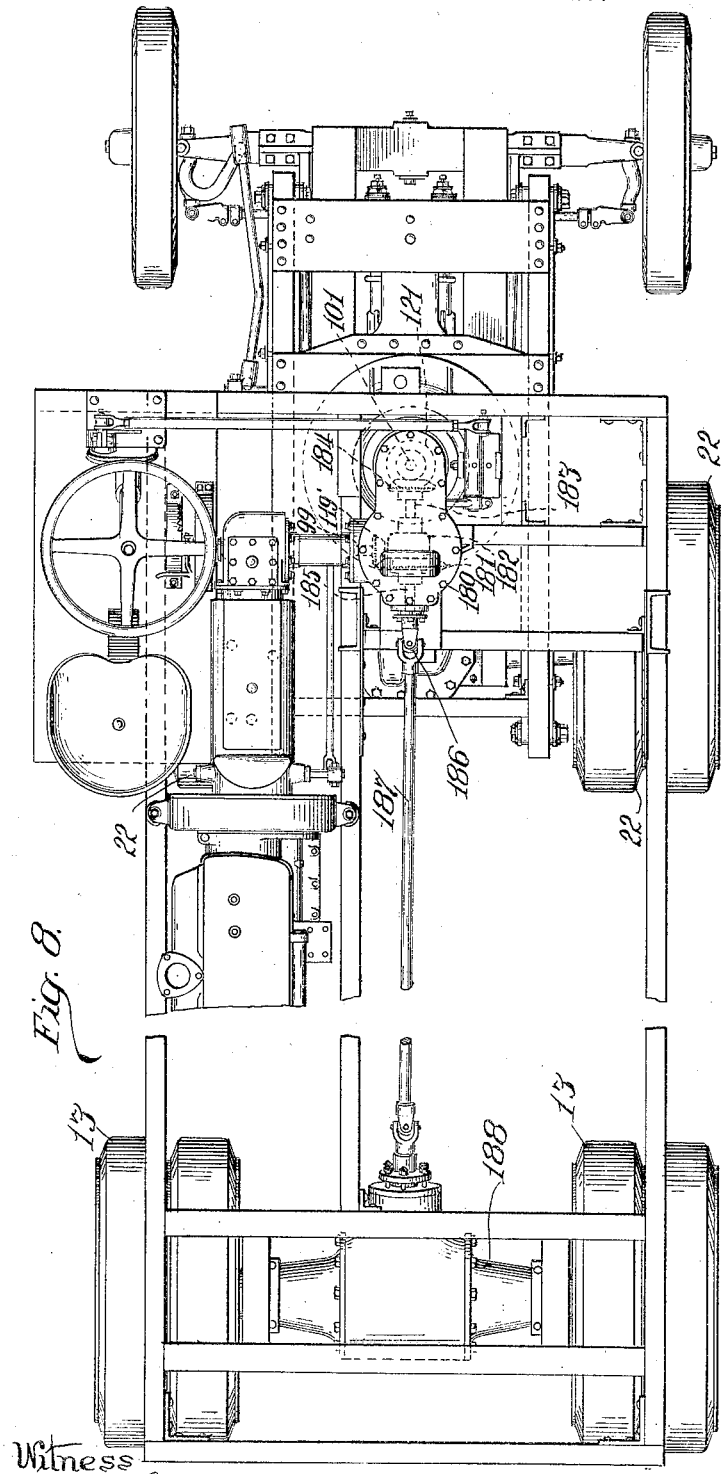

Patented July 5, 1932

1,865,463

UNITED STATES PATENT OFFICE

ROLLA A. MORTON, OF LONG BEACH, CALIFORNIA

TRACTION TRUCK FOR VEHICLES

Application filed March 23, 1927. Serial No. 177,512.

The present invention relates to traction trucks for vehicles, and aims generally to provide an improved construction of vehicle characterized by a traction truck which serves as a propelling and steering unit for the vehicle. One class of vehicles of the type to which my invention has particular application are represented by road grading machines, the embodiment of the invention herein shown being such a machine. The advantages of the invention for other vehicles and uses such as trucks, dump wagons, hook-and-ladder fire trucks, road making and maintenance machines, sweepers, snow cleaners and vehicles generally where a front drive and a short turning radius are desired will be evident, however, from the following description. One of the particular objects of the invention is to obtain a power drive from the internal combustion engine or other form of motor mounted on the main frame of the vehicle to the propelling wheels of the truck. Such drive extends down through the fifth wheel around which the traction truck has steering movement relative to the main frame of the vehicle, and certain features of the invention reside in the mechanism whereby this is accomplished.

Another object of the invention is to provide improved means for steering the traction truck from a steering control mounted on the main frame of the vehicle. Such steering linkage also extends through the fifth wheel around which the traction truck has its swinging steering movement, and other features of the invention reside in the mechanism whereby this is accomplished.

Other objects of the invention pertaining to the frame construction of the traction truck, to the spring suspension of the truck, and to other features thereof will be set forth at length in the following description of the invention.

In the drawings accompanying this description,—

Fig. 4 is a vertical transverse sectional view through this front end, taken approximately on the plane of the line 4—4 of Fig. 3;

Fig. 5 is a horizontal sectional view through the traction truck on a plane approximately between the upper and lower truck frames, as indicated by the line 5—5 of Fig. 3;

Fig. 6 is a fragmentary vertical sectional view taken on the plane of the line 6—6 of Fig. 2, and illustrating a portion of the power transmission train;

Fig. 7 is a vertical transverse sectional view through the front end of the traction truck, looking forward as indicated by the section plane 7—7 of Fig. 3; and Fig. 8 is a plan view, partly broken away, of a vehicle embodying a modified construction of my invention.

Figure 1:
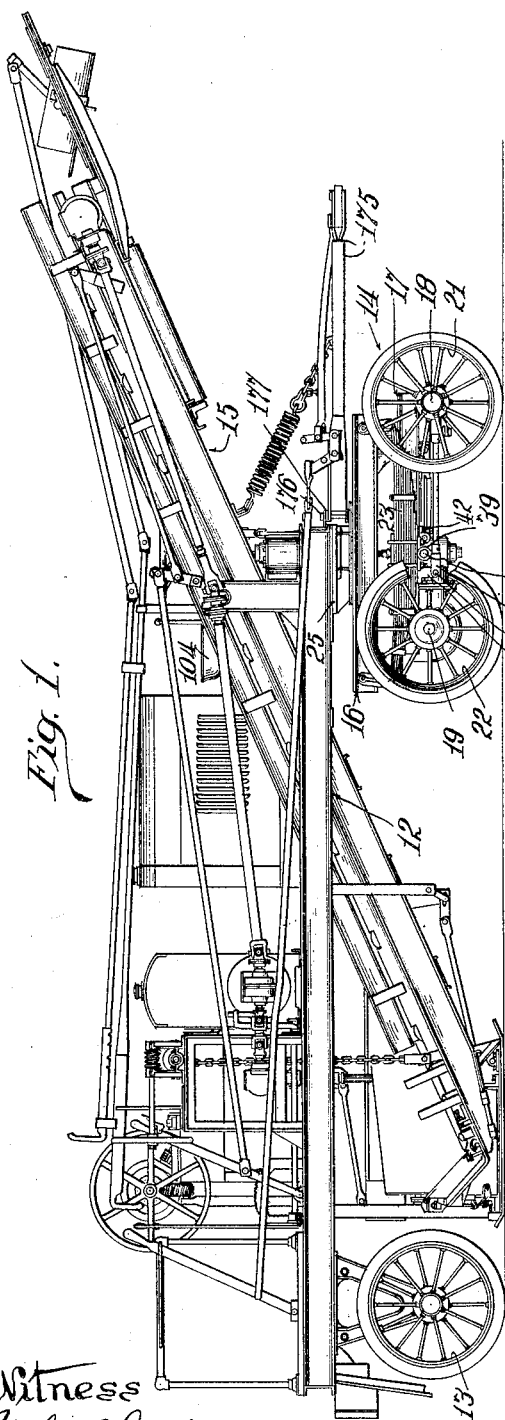
Fig. 1 is a side elevational view of the grading and loading machine in its entirety, the present traction truck constituting a wheeled support for the front end of the main frame of such machine.

The grading and loading machine illustrated in Fig. 1 is of the general type disclosed in the co-pending application filed by myself and Edward P. Henry on March 17, 1924, and identified as Serial No. 699,860. The machine is designed to excavate or grade roadways, etc., and to load the excavated material into an automobile truck which precedes the grading and loading machine. In the construction disclosed in the above application such machine was hitched to the automobile truck and was towed thereby in performing the grading operation. This required that each of the trucks which were used in conjunction with the grading and loading machine be of large size with sufficient tractive power to pull the machine in its grading operation. Trucks of this capacity are not always available, and in some instances are not usable owing to soft ground, et cetera. The steering of this prior form of grading and loading machine also required a large radius, owing to the length of the machine, and it was therefore difficult at times to dodge man-holes and other obstructions and to otherwise manœuvre the machine.

In the present construction the grading and loading machine is self-propelled, and while the machine may be hitched to the preceding automobile truck to maintain the proper loading relation between the two, the propelling power required for the grader and loader is derived practically entirely from its own power plant, although, of course, the automobile truck may be operated to assist somewhat in the forward motion of the grading machine, if desired. The present construction of grader and loader can be steered through a comparatively short radius so that the machine can be manœuvred more quickly and in smaller spaces than the prior machine above mentioned, this resulting from the ability of the traction truck to swing to any steering angle around its fifth wheel mounting under the front end of the main frame, and from the ability of the truck to steer sharply to one side or the other under its power drive independently of the forward draft of the automobile truck. Furthermore, by the provision of this dirigible traction truck, the machine can be manœuvred or turned about while waiting for the next truck to be brought up for loading.

The main frame is indicated at 12, it being supported at its rear end on suitable rear wheels 13 and at its front end on the present traction truck 14. The details of the plow apparatus for performing the grading operation, and of the conveyor mechanism for loading the excavated material into the vehicle preceding the machine, are fully disclosed in the above-mentioned co-pending application and in and of themselves do not constitute any part of the present invention. It will suffice to say that the plow cuts a furrow of any desired depth, and that the material excavated thereby is conveyed forwardly by a longitudinally extending conveyor 15 which projects over the front end of the machine to discharge into the preceding vehicle.

The traction truck is a four-wheel truck, and as above remarked it swings as a unit around its fifth wheel connection with the main frame 12. The truck has a compound frame consisting of an upper frame section 16 and a lower frame section 17, the upper frame establishing the fifth wheel connection with the main frame 12 of the vehicle, and the lower frame mounting the front and rear axles 18 and 19 on which the front and rear wheels 21 and 22 are supported. The front wheels 21 are the steering wheels of the unit, preferably having steering knuckle mounting as in standard automobile practice, and the rear wheels 22 constitute the drive wheels for the unit to which the propelling energy for the vehicle is transmitted. The upper and lower frames 16 and 17 are connected together through leaf springs 23, thus establishing a spring suspension for the upper frame 16 whereby vertical movement of the truck wheels in striking road obstructions is absorbed to a considerable extent in the spring suspension between the two truck frames.

Figure 2:
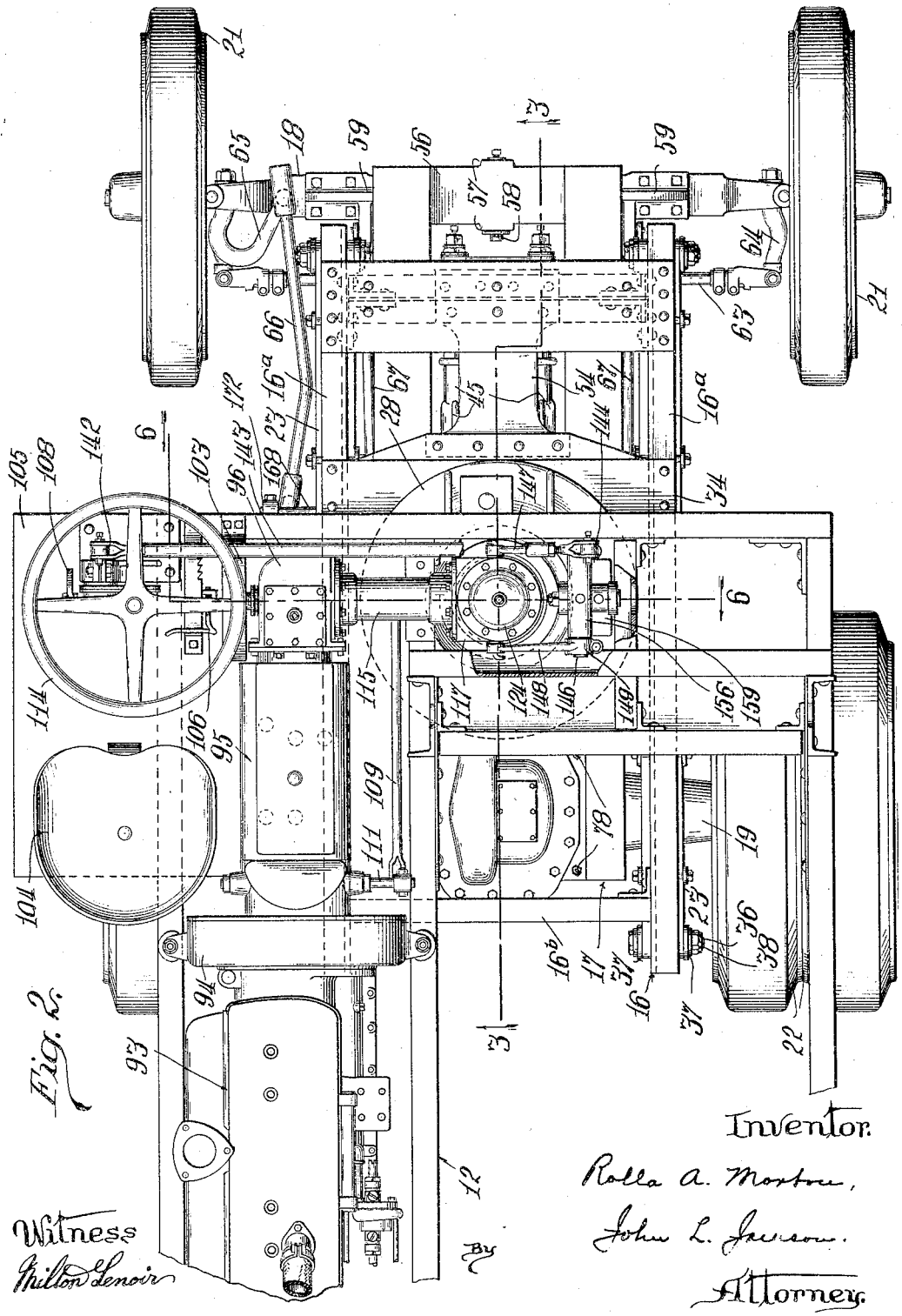
Fig. 2 is a fragmentary plan view of the front end of the vehicle, taken on a plane below the longitudinal conveyor.
Figure 3:
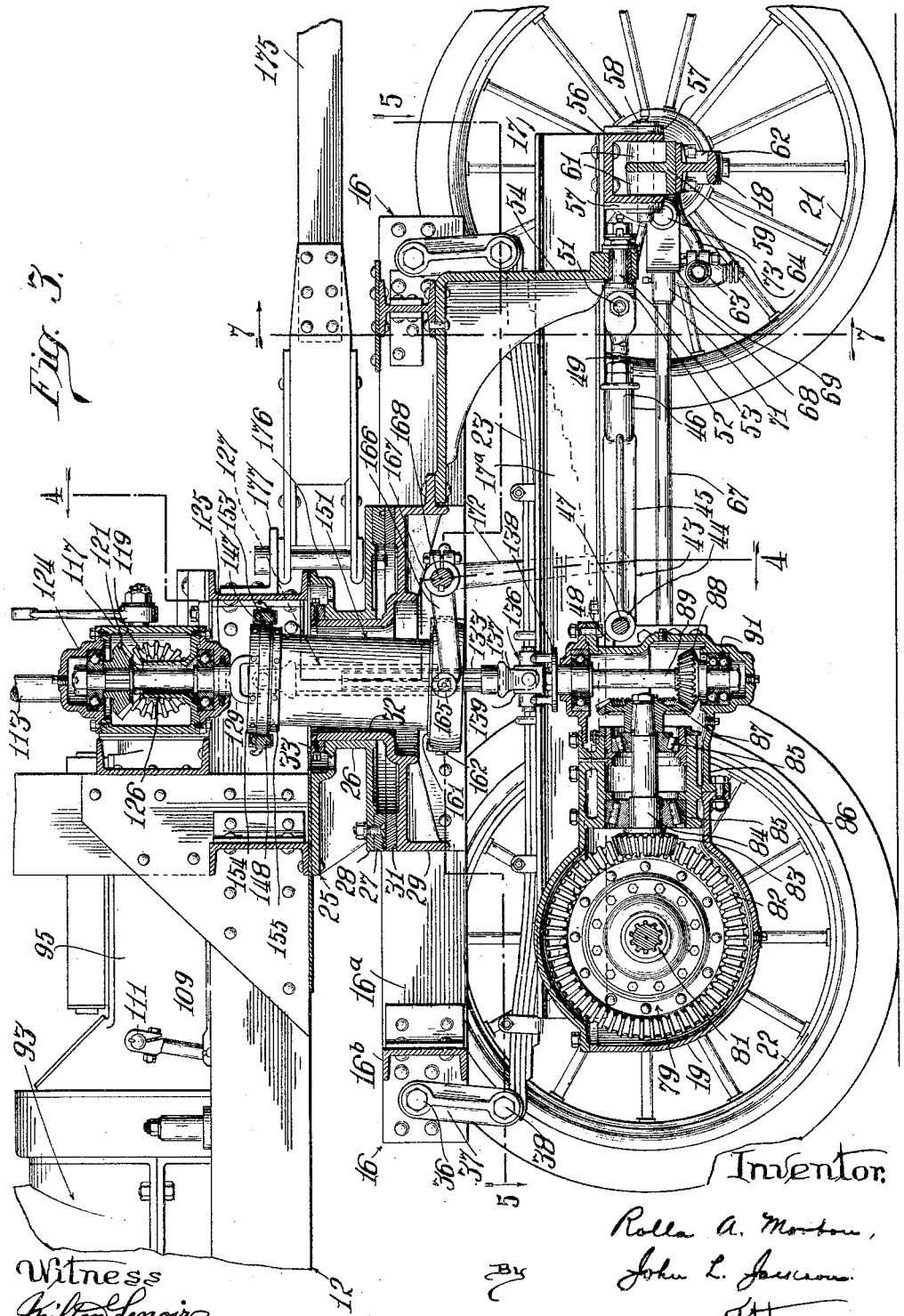
Fig. 3 is a vertical longitudinal sectional view through this front end, taken approximately on the plane of the line 3—3 of Fig. 2.

Referring now to the more specific details shown in Figs. 2, 3, 4, et cetera, there is secured to the under side of the main frame at its front end a head casting 25 comprising a vertical journal 26. The lower end of this journal is provided with one section of a fifth wheel, such section preferably consisting of a flat ring 27 which is bolted to a flange 28 projecting outwardly from the lower end of the journal. A rectangular casting 29 is secured to the upper truck frame 16 and carries the other section 31 of the fifth wheel, this latter section also consisting of a flat ring having bearing contact with the upper ring 27. Extending upwardly from the center of the rectangular casting 29 is a hollow trunnion 32 which engages with a snug bearing fit within the journal 26. A ring 33 secured to the upper end of the trunnion 32 prevents accidental separation of the trunnion from its journal 26. The weight of the front end of the vehicle is borne on the two bearing surfaces 27 and 31 of the fifth wheel, and the tractive effort of the truck is transmitted to the main frame through the journal and trunnion mounting 26 and 32. It will be obvious that this connection between the traction truck and main frame permits the truck to swing to any steering angle relative to the main frame.

The upper frame portion 16 of the truck is constructed with any desired arrangement of longitudinal and transverse channels 16$^a$ and 16$^b$ suitably riveted together. In the mounting of the rectangular casting 29 on this frame it will be observed from Fig. 6 that this casting has horizontal flanges 34 which bear on the top of the side channels 16$^a$ and vertical flanges 35 which bear against the inner sides of the channels, such flanges being riveted to the channels. Thus the casting serves as an intermediate re-enforcing member for the frame. The ends of the side channels 16$^a$ project beyond the cross channels 16$^b$, and mounted in these projecting ends are pins or bolts 36 upon the ends of which are pivoted pairs of shackle links 37. The lower ends of these links carry shackle bolts 38 which receive eyes formed in the ends of the two leaf springs 23. These springs are of semi-elliptic form and extend longitudinally of the truck frame at each side thereof. Bolted to the centers of the springs are blocks 39 (Figs. 4 and 5), which have pivotal mounting on trunnion pins 41 projecting from brackets 42 bolted to the under side of the lower truck frame 17. It will be observed that this form of spring suspension permits of a maximum length of leaf spring at each side of the truck within the comparatively short length of the truck.

The tractive effort imparted to the lower frame 17 from the rear traction wheels 22 is transmitted to the upper truck frame 16 through a torque or radius member 43, so that the springs 23 do not have to carry any of the propelling or braking stresses. As shown in Fig. 5, this radius member preferably consists of a relatively long transverse hub 44 and two forwardly projecting arms 45, in the ends of which arms are formed threaded sockets 46. A shaft 47 extends through the hub portion 44 and has its ends mounted in brackets 48 bolted to the under side of the lower truck frame 17, whereby the rear end of this radius member is pivotally connected to the lower frame. Screwing into the threaded sockets 46 are clevis bolts 49 which are pivotally connected at 51 to tongue portions 52 projecting from the rear ends of bolts 53. As shown in Fig. 3, these latter bolts are rotatably mounted in bushings in the lower end of an angular bracket 54 which is riveted to the upper frame 16. Referring to Fig. 7, this bracket has a central re-enforcing rib, and the front depending portion of the bracket extends down to dispose the rotatable bolts 53 in approximately the same horizontal plane as the transverse pivot shaft 47 upon which the rear end of the radius member is pivoted. The rotatable mounting of the bolts 53 accommodates a lateral rocking of the radius member 43, incident to the lateral rocking of the lower frame in the travel of the truck wheels over obstructions in the road.

The lower truck frame 17 preferably comprises two longitudinally extending I-beams 17ᵃ which are set inwardly from the side channels 16ᵃ of the upper frame so that the springs 23 will extend down on the outer sides of the I-beams. The front ends of these beams are bolted to a front bolster 56 having spaced bearing bosses 57 between which passes a bolster pin 58. Bolted to the front axle 18 is a strut 59 having a raised hub portion 61 which extends in between the bosses 57 and receives the bolster pin 58 (Figs. 3 and 7). Thus the front axle 18 is pivotally supported in the bolster 56 for transverse rocking movement relative to the lower frame.

The ends of this axle are forked to support steering knuckles 62, on the spindle portions of which the front wheels 21 are journaled. A cross rod 63 is pivotally connected to arms 64 extending from both steering knuckles, and a second arm 65 extends from one of the knuckles for pivotal connection with a drag link 66, all in accordance with standard practice. The steering mechanism whereby these steering wheels are actuated from a control position on the main frame will be hereinafter described. The front axle is held against stresses tending to twist the same relative to the bolster by radius rods 67 connecting to the axle adjacent the outer ends thereof and extending back to points of pivotal attachment to the lower frame. Referring to Fig. 5, each of these radius rods has its front end extending through a bushing 68 carried by a clevis 69, the rod having rotative swiveling motion within such bushing and being held from shifting longitudinally therein by a collar 71 bearing against one end of the bushing, and by a nut 72 screwing over the rod and bearing against the other end of the bushing. Each clevis 69 is pivotally connected by a pivot pin 73 to a lug 74 projecting from the rear of the front axle strut 59. The rear ends of the radius rods have similar mounting in clevises 75 which are pivotally connected at 76 to brackets 77 (Fig. 1) extending down from the lower frame 17. The swiveled connections of the ends of these radius rods accommodates lateral rocking of the front axle relative to the lower frame.

The rear ends of the I-beams 17ᵃ are bolted to flat bolting surfaces formed on the top of the rear axle housing 19, as indicated at 78. This housing encloses a conventional type of differential mechanism 79 for driving the axle shafts 81 which extend out to the traction wheels 22. As shown in Fig. 5, these wheels preferably carry two treads for greater load bearing capacity and greater traction area. It will be observed that the pivotal connection of the spring blocks 39 to the lower frame 17 is at a point considerably closer to the rear axle than to the front axle whereby the major portion of the load carried by the traction truck is concentrated on the rear wheels. This assures high tractive efficiency of the rear wheels and light steering of the front wheels.

The ring gear 82 on the differential 79 is driven by a bevel pinion 83 which is mounted on a short horizontal shaft 84 journaled in anti-friction bearings 85 in a housing 86 formed as a forward extension of the axle housing. The front end of the shaft 84 carries a bevel gear 87 which meshes with a bevel pinion 88 mounted on an upright shaft 89, the latter also having bearing support in anti-friction bearings 91 in the front portion of the housing 86. The driving train of which the two shafts 84 and 89 form a part can be best described by proceeding from the engine end of the train, and accordingly I shall first describe the engine and the controls associated therewith.

Referring to Fig. 2, the power plant represented by the internal combustion engine 93 or any other suitable type of motor is mounted on the main frame 12, preferably at one side of the longitudinal conveyor 15 and in proximity to the front end of the machine. When an internal combustion engine is used as the source of power the drive therefrom is through suitable clutch mechanism represented by the clutch housing 94 and through a suitable change speed gear set indicated by the housing 95. The gear set 95 is any desired type of transmission mechanism affording a plurality of speeds forward and one or more reverse speeds. The end of the transmission housing 95 is bolted to an angle housing 96 in which is disposed a bevel gear 97 (Fig. 6) mounted on the drive shaft of the transmission mechanism. Meshing with this gear is another bevel gear 98 keyed to a transversely extending jack shaft 99. One end of this shaft extends over to the center of the vehicle where it transmits its drive to a vertically extending shaft 101, as will be presently described. The other end of the jack shaft 99 extends through the outer wall of the housing 96 and carries a brake wheel 102 on which operates any suitable form of brake band 103. The operator's control position, as represented by the seat 104 and laterally extending platform 105, is alongside the selective speed transmission mechanism 95, and over one edge of the vehicle, from which position the operator can observe the line of the furrow cut by the plow. A brake pedal 106 is pivotally supported on the platform 105 and is operatively connected through any suitable linkage 107 (Fig. 4) with the brake band 103. A clutch pedal 108, also pivotally supported on the platform 105, is connected through any suitable linkage 109 (Fig. 2) with the control shaft 111 of the clutch mechanism 94. The speed selection of the gear set is effected by a suitable transmission lever 112 extending up in convenient proximity to the seat 104. A steering column 113 extends upwardly between the brake and clutch pedals and supports a steering wheel 114 at its upper end. The steering linkage through which motion is transmitted from the control wheel 114 to the steering wheels of the truck will be hereinafter described.

Referring again to the transverse drive shaft 99, it will be observed from Fig. 6 that this shaft extends through a tubular housing 115 in which are mounted anti-friction bearings 116 supporting the ends of the shaft. One end of this tubular housing is bolted to the housing 96, and the other end is bolted to the side of another bevel gear housing 117. A bracket portion 118 formed integral with the tubular housing 115 supports the latter on the main frame, and through this tubular housing supports the bevel gear housing 117. Keyed to the end of the shaft 99 within this latter housing is a bevel gear 119 which meshes with a bevel gear 121 splined on the upper end of the vertically extending shaft 101. The latter is journaled in anti-friction bearings 122 and 123, the upper bearing 122 being carried in the removable end head 124 and the lower bearing being supported in a recessed plate 125 which is bolted to the bottom wall of the housing. A sleeve 126 extends upwardly from this bottom wall in spaced relation to the shaft 101 to confine a volume of lubricant in the lower part of the housing and to limit the supply of lubricant to the lower bearing 123, such supply being carried up by the gears and splashed into the upper end of the sleeve.

The shaft 101 is alined axially with the hollow trunnion 32. Extending down through this trunnion is a telescopic drive sleeve 127, the upper end of which is connected to the shaft 101 by a universal joint 128. This universal joint may be of any suitable construction, in the form shown consisting of a yoke 129 which is keyed to the lower end of the shaft 101, and a cooperating yoke 131 formed on the upper end of the sleeve 127. A pivot block 132 has universal pivot mounting between the arms of both of these yokes, in a manner well known. The sleeve 127 has telescopic engagement over a shaft 133, a non-rotating relation being established between this sleeve and shaft by splines or flutes 134 in the sleeve engaging over correspondingly formed splines or flutes 135 formed in the shaft. Referring to Fig. 3, the lower end of the telescopic shaft 133 has connection through a universal joint 136 with the upper end of the vertical drive shaft 89 hereinbefore referred to. This universal joint comprises any suitable arrangement of yokes 137 and 138 mounted on the ends of the shafts 133 and 89, respectively, and engaging over a pivot block 139 with which both yokes have universal pivotal connection.

This completes the driving train between the motor 93 and the traction wheels 22 of the truck. Through this driving train the machine can be propelled either forwardly or backwardly, and through the operation of the selective speed transmission 95 the machine can be operated at any desired grading or transport speed.

By extending the power transmission line axially through the fifth wheel mounting of the truck the latter is free to assume any desired angle in steering without affecting the power drive. The interposition of the telescopic drive connection 127—133 in this portion of the transmission train permits upward movement of the lower truck frame relative to the main vehicle frame, incident in the wheels of the truck passing over obstructions in the road. The fore-and-aft tilting of the lower truck frame about the trunnions 41, incident in the movement of the truck wheels over obstructions and up and down slopes, is accommodated by the universal joints 128 and 136 in cooperation with the telescopic drive connection 127—133. Lateral tilting of the lower truck frame is also accommodated by these universal joints and telescopic drive connection. It should be noted that the axis of this vertically extending portion of the transmission train is in substantially the same transverse plane as the trunnions 41 on which the lower frame has its connection with the leaf springs, whereby fore-and-aft tilting of the lower frame only results in a relatively small swinging movement of the lower universal joint and telescopic drive connection.

Referring now to the details of the steering apparatus, the lower end of the steering column illustrated in Fig. 4 houses any conventional form of segment gear mechanism from which extends a shaft 141. Mounted on this shaft is an arm 142, to the upper end of which is pivotally connected a link 143. The other end of this link is pivotally connected to an upwardly extending arm 144 supported on the main frame adjacent the trunnion journal 26. This arm comprises a split hub 145 which is clamped and keyed to a rock shaft 146. Extending from the hub 145 is a horizontal arm 147, the two arms 144 and 147 forming in effect a bell-crank lever, and extending from the other end of the rock shaft 146 is a second horizontal arm 148 (Fig. 2), which also comprises a split hub 149, keyed and clamped to the rock shaft 146. The two arms 147 and 148 form a fork embracing the upper end of a reciprocable sleeve 151 extending down through the hollow trunnion 32. This sleeve is spaced from the interior of the trunnion and also from the transmission drive elements 127 and 128 so that it can have lateral swinging or rocking movement with its vertical reciprocation. The ends of the arms 147 and 148 have bosses engaging over pivot studs 152 projecting outwardly from diametrically opposite points of a ring 153 encircling the upper end of the sleeve 151. The sleeve is arranged for rotation within this ring, the latter being confined between upper and lower thrusting rings 154 and 155 fixedly secured to the sleeve by screws or rivets.

Referring to Figs. 2 and 6, the rock shaft 146 has bearing support in a journal member 156 which is arranged for transverse rocking movement about an axis disposed at right angles to the axis of the rock shaft. This journal member comprises the long bearing sleeve in which the rock shaft is journaled, and a short bearing sleeve 157 extending at right angles thereto. The short bearing sleeve is pivotally mounted on a pivot bolt 158, the ends of which are supported in the arms of a U-shaped bracket 159, bolted to the main frame of the machine. This tiltable mounting of the journal member 156 permits limited lateral tilting of the rock shaft 146, whereby fore-and-aft tilting of the sleeve 151 is accommodated, as will hereinafter appear.

Fixedly secured to the lower end of this sleeve is a ring 161, from which extend diametrically opposite trunnion pins 162, preferably disposed in a plane extending fore-and-aft of the truck. Referring to Fig. 4, such trunnion pins extend into bearings 163 carried by a universal ring 164 which encircles the lower end of the sleeve. The latter ring is spaced slightly from the fixed ring 161 so that it may rock about the trunnion pins 162. Projecting outwardly from diametrically opposite points of the outer ring 164 are trunnion pins 165, these pins being disposed in a plane at right angles to the plane of the pins 162, i. e., in a plane extending transversely of the truck. Pivotally engaging over these outer trunnion pins are two arms 166 (Fig. 5) which extend forwardly and have split hubs 167 which are keyed to a transversely extending rock shaft 168. The ends of the shaft 168 are supported in bearing bushings 169 extending through the sides of the casting 29 and through the side channels 16ª of the upper frame. Collars 171 secured to this shaft and engaging the inner ends of such bushings confine the shaft against shifting movement. One end of the shaft extends laterally beyond the side of the truck frame and carries an arm 172 extending downwardly from the shaft (Fig. 4). The lower end of this arm supports a suitable ball stud 173 which has pivotal connection with the rear end of the drag link 66, which extends up to the steering knuckle arm 65, as above described.

In the operation of the steering control wheel 114 motion will be transmitted to the upper end of the sleeve 151 through the above described steering mechanism mounted on the frame, to-wit, the link 143, arm 144, and the two arms 147 and 148 which define the fork embracing the upper end of the sleeve and engaging therewith through the ring 153. The sleeve will be moved upwardly or downwardly, depending upon the direction of steering motion given the control wheel, and this will in turn actuate the steering mechanism on the truck frame through the universal ring 164, causing swinging motion of the fork defined by the two arms 166 and consequent rocking movement of the shaft 168 with resultant forward or backward movement of the drag link 66. By virtue of the swivel connection established between the sleeve 151 and the fork arms 147—148 through the swivel ring 153, any steering deflection given the front wheels of the truck is not influenced by the swinging movement of the truck relative to the main frame. This will be evident from the fact that the swinging movement of the truck will merely revolve the sleeve within the ring 153. In the reciprocatory movement of the sleeve, the upper end thereof will obviously swing through an arc around the center of the upper fork supporting shaft 146. When the parts are in the positions shown in Fig. 4, this lateral swinging movement of the upper end of the sleeve is permitted by the rocking of the lower end of the sleeve around its trunnion pin mounting 162 in the lower ring 164. Similarly, the lower end thereof will swing through an arc around the center of the lower fork supporting shaft 168, see Fig. 3. With the parts in the positions shown, such fore and aft swinging movement of the lower end of the sleeeve is permitted by the rocking of the upper shaft 146 about the axis of the short cross shaft 158. When, through a steering operation, the truck has swung around to an angle approximately at right angles to the main frame, the two fork supporting shafts 146 and 168 lie in substantial parallelism and hence the arcuate swinging motion of the upper and lower ends of the sleeve will be accommodated by the trunnion pin connections 152 and 165. In any intermediate angular postion of the truck, the arcuate swinging motions of the upper and lower end of the sleeve will be accommodated by the universal movement of the upper fork 147—148 and by the universal connection through the lower trunnion ring 164.

The hitch relation between the present machine and the preceding automobile truck or other vehicle which is to receive the excavated material, is established through a draft beam 175 or other draft means connected to the front end of the main frame. In the construction shown the draft beam 175 is pivotally connected on a pin 176, which extends between a bracket 177 secured to the main frame and the flange 28 of the journal casting 25.

As remarked in the forepart of the specification, the advantages of the invention are not confined to road grading and loading machines, but may be realized in numerous other types of vehicles. Fig. 8 illustrates the invention embodied in a vehicle which may be employed for any desired use. In this figure I have also illustrated a modified construction whereby the rear wheels 13 of the vehicle are also employed as traction wheels to assist the traction truck in propelling the vehicle. The construction previously described may be followed almost entirely in this modified construction, with the exception that provision is made for interposing a differential mechanism between the drive to the traction truck and the drive to the rear wheels. One manner of interposing this differential is to locate the transversely extending shaft 99 slightly in rear of the axis of the vertical shaft 101, and to have this transversely extending shaft enter a differential housing 180 where the gear 119′ on such shaft meshes with the ring gear 181 of a differential mechanism 182. A shaft 183 extending forwardly from this differential carries a bevel gear 184 which meshes with the bevel gear 121 on the vertical shaft 101. The differential housing may be formed as a part of the housing 117. Extending rearwardly from the differential mechanism is a shaft 185 which passes out through a suitable bearing in the rear wall of the differential housing and connects through a universal joint 186 with a propeller shaft 187 extending back to the rear axle 188. Here this shaft has any suitable driving connection through a conventional differential mechanism with axle shafts driving the rear wheels 13. By the foregoing construction, propelling power is transmitted to the traction wheels 22 of the truck and to the rear wheels 13 of the main frame, so that the advantages of a four wheel drive are obtained.

While I have shown what I consider to be the preferred embodiment of my invention it will be understood that this embodiment is merely exemplary, and I do not consider the invention as being limited to any of the particular details thereof, except as such details are defined in the appended claims.

What I claim as my invention and desire to secure by Letters Patent, is:—

1. A vehicle comprising a main frame, a traction truck therefor comprising upper and lower truck frames, a fifth wheel connection between said main frame and said upper truck frame, propelling and steering wheels on said lower truck frame, springs connecting said upper and lower truck frames, a motor on said main frame, and power transmission mechanism connecting said motor with said propelling wheels, said power transmission mechanism comprising a telescopic drive connection permitting relative vertical movement between said upper and lower truck frames.

2. A vehicle comprising a main frame, a truck serving as a propelling and steering unit therefor, said truck comprising a frame, propelling and steering wheels mounted thereon, a hollow journal on said main frame, a cooperating hollow trunnion on said truck frame and fitting into said journal for permitting lateral steering motion of said truck relative to said main frame, a motor mounted on said main frame, and power transmission mechanism connecting said motor with said propelling wheels and comprising a telescopic drive connection extending down through said hollow trunnion.

3. A vehicle comprising a main frame, a truck having swiveled connection therewith, said truck comprising upper and lower frames, wheels on said lower frame, shackles connected to said upper frame, leaf springs pivotally connected to said shackles, and trunnion pins pivotally connecting the intermediate portions of said leaf springs with said lower truck frame, the axis of said pins being substantially in the plane of the axis of said swiveled connection.

4. In a vehicle of the class described, the combination of a main frame, a truck comprising upper and lower frames, a hollow trunnion connecting said upper frame to said main frame for swinging movement of said truck relative to said upper frame, front and rear axles carried by said lower frame, steering and propelling wheels on said axles, power transmission mechanism extending through said hollow trunnion and operatively connected to said propelling wheels, longitudinally extending leaf springs having their ends connected to said upper frame, trunnion pins connecting the intermediate portions of said springs to said lower frame, and a radius member connecting said upper and lower truck frames.

5. In a vehicle of the class described, the combination of a main frame, a truck comprising upper and lower frames, a hollow trunnion pivotally connecting said upper truck frame with said main frame for horizontal steering movement of said truck relative to said main frame, shackle links pivotally connected to the front and rear ends of said upper frame, semi-elliptic leaf springs having their ends connected to said shackle links, trunnion pins pivotally connecting the intermediate portions of said leaf springs to said lower frame, a rear axle secured to said lower frame, driving wheels carried by said rear axle, an internal combustion engine mounted on said main frame, power transmission mechanism extending through said hollow trunnion and connecting with said driving wheels, a radius member pivotally connected between said upper and lower frames, a bolster connected to said lower frame, a front axle pivoted to said bolster for transverse rocking movement, steering wheels on said front axle, radius members connecting said front axle with said lower frame, a steering control on said upper frame, and motion transmitting mechanism extending from said steering control through said hollow trunnion and connecting to said steering wheels.

ROLLA A. MORTON.